(12) United States Patent
Gupta et al.

(10) Patent No.: US 9,259,858 B2
(45) Date of Patent: Feb. 16, 2016

(54) LAMINATE STITCHING METHOD FOR IMPROVED FIBER LOGISTICS AND PLACEMENT PRECISION

(71) Applicants: Neil Rohin Gupta, Costa Mesa, CA (US); Terry Buelna, Lake Forest, CA (US)

(72) Inventors: Neil Rohin Gupta, Costa Mesa, CA (US); Terry Buelna, Lake Forest, CA (US)

(73) Assignee: Green Dynamics Corporation, Cotuit, MA (US)

( * ) Notice: Subject to any disclaimer, the term of this patent is extended or adjusted under 35 U.S.C. 154(b) by 0 days.

(21) Appl. No.: 14/517,783

(22) Filed: Oct. 17, 2014

(65) Prior Publication Data
US 2015/0107505 A1 Apr. 23, 2015

Related U.S. Application Data

(60) Provisional application No. 61/893,056, filed on Oct. 18, 2013.

(51) Int. Cl.
| | | |
|---|---|---|
| *B29B 11/04* | (2006.01) | |
| *B32B 7/04* | (2006.01) | |
| *B29B 11/02* | (2006.01) | |
| *D05B 23/00* | (2006.01) | |
| *B29K 105/08* | (2006.01) | |

(52) U.S. Cl.
CPC ............. *B29B 11/04* (2013.01); *B29B 11/02* (2013.01); *B32B 7/04* (2013.01); *D05B 23/00* (2013.01); *B29K 2105/0872* (2013.01)

(58) Field of Classification Search
CPC ............ A41D 27/06; B32B 5/26; B32B 5/12; B32B 7/005; B32B 7/04; B32B 7/08; B32B 3/06; B32B 9/00; B32B 2250/03; B32B 2250/20; B32B 2250/44; B29B 11/02; B29B 11/04; B29B 11/06; D05B 33/00; B29K 2105/0872
See application file for complete search history.

(56) References Cited

U.S. PATENT DOCUMENTS

| | | | | |
|---|---|---|---|---|
| 4,410,577 | A * | 10/1983 | Palmer ................... | B29C 70/24 112/405 |
| 4,901,706 | A * | 2/1990 | Schwanke, Jr. ..... | A47G 27/0206 126/221 |
| 5,102,723 | A * | 4/1992 | Pepin ...................... | B32B 7/04 244/133 |
| 5,150,476 | A * | 9/1992 | Statham ............. | A41D 31/0027 2/272 |
| 5,429,853 | A * | 7/1995 | Darrieux ................. | B29C 70/24 112/440 |
| 6,290,800 | B1 * | 9/2001 | Antinori .................. | B32B 5/22 156/276 |
| 2004/0005435 | A1 * | 1/2004 | GangaRao .............. | B29C 70/24 428/102 |
| 2005/0129897 | A1 * | 6/2005 | Zhou ....................... | A47K 7/02 428/43 |
| 2007/0292669 | A1 * | 12/2007 | Yamasaki ............. | B29C 70/086 428/213 |
| 2009/0223588 | A1 * | 9/2009 | Dunleavy ............... | F16C 7/026 139/384 R |

* cited by examiner

*Primary Examiner* — Ismael Izaguirre
(74) *Attorney, Agent, or Firm* — White & Case LLP

(57) ABSTRACT

In one embodiment, a method for forming a dry lamination for a composite fiber material structure, for example a wind turbine blade, includes cutting at least two plies of composite fiber material according to a predetermined pattern, arranging the at least two cut plies of composite fiber material in a predetermined arrangement relative to each other, stitching the at least two cut plies together using a thread to secure the at least two cut plies in the predetermined arrangement to form the dry lamination, and spooling the dry lamination into a single roll. The dry lamination can then be transported without misaligning the plies and placed into a resin infusion tool without requiring manual placement of individual plies of composite fiber material.

19 Claims, 11 Drawing Sheets

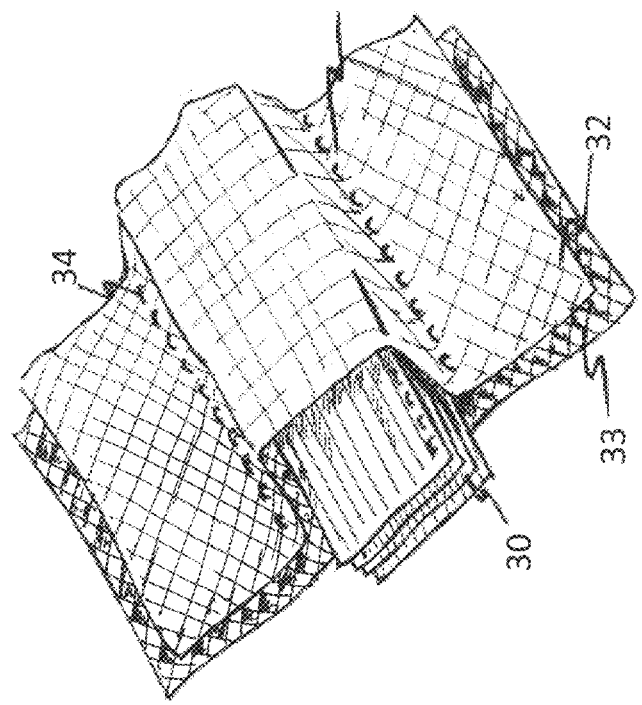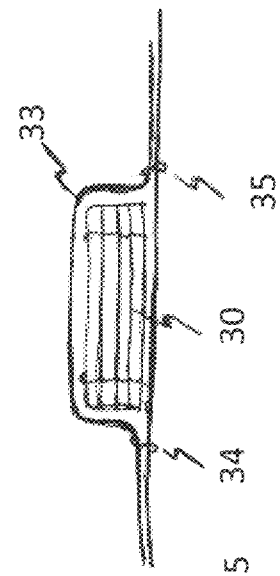

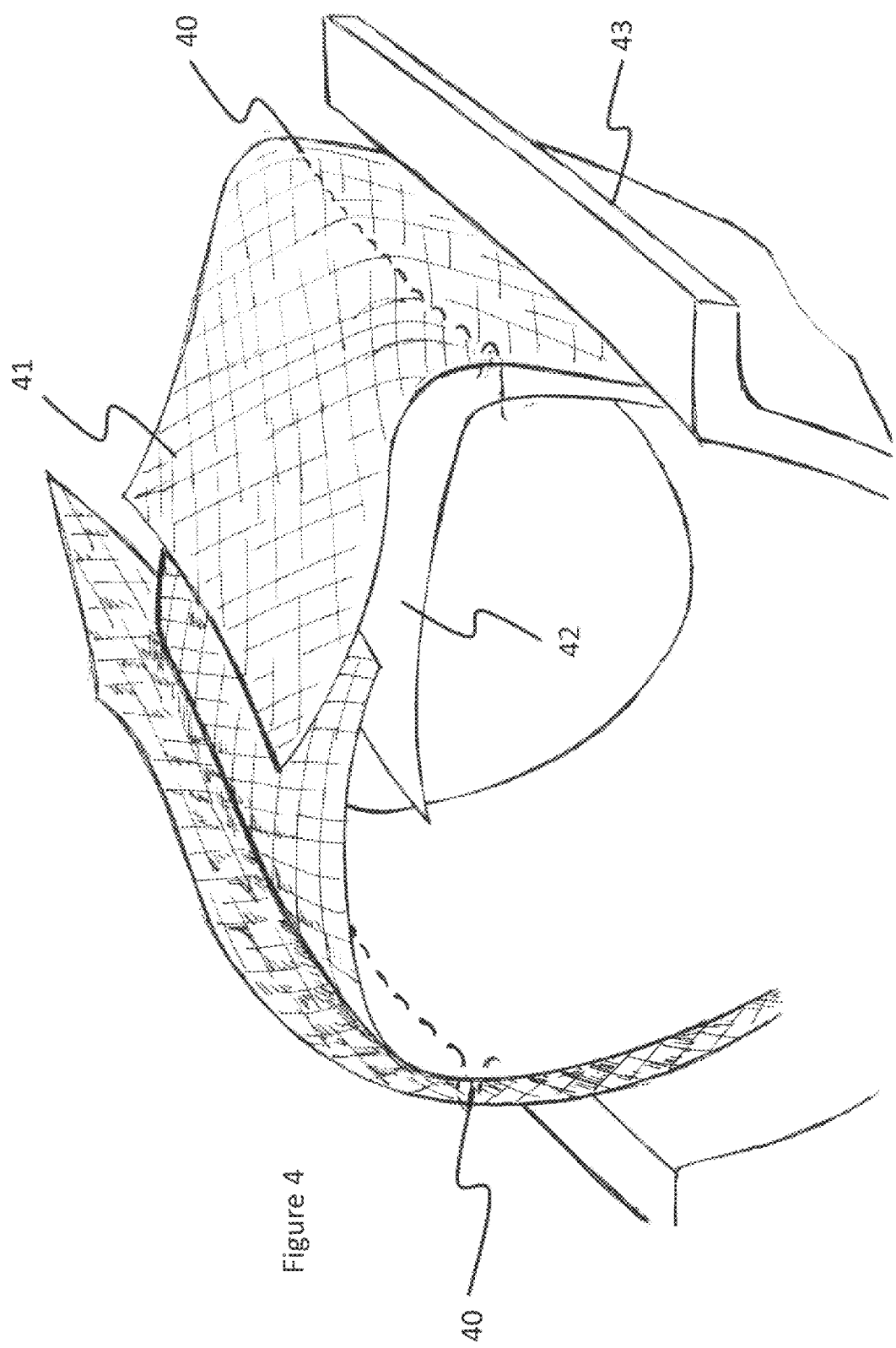

LAMINATE STITCHING METHOD FOR IMPROVED FIBER LOGISTICS AND PLACEMENT PRECISION

CROSS-REFERENCE TO RELATED APPLICATION

This application claims the benefit of U.S. Provisional Patent Application No. 61/893,056, entitled "Laminate Stitching Method for Improved Fiber Logistics and Placement Precision," filed on Oct. 18, 2013. The subject matter of the related application is hereby incorporated by reference in its entirety.

FIELD OF THE INVENTION

This invention relates generally to manufacturing composite fiber material structures and more specifically to a laminate stitching method for improved fiber logistics and placement precision.

BACKGROUND

Composite materials have the capability to deliver increased structural performance over traditional metal or polymer options. Typically, composites combine the environmental resiliency of polymers with the strength and stiffness properties of the fibers from which they are derived. This family of fibers most regularly includes glass, aramids, and carbon. Composite fibers can be woven into fabrics, which are typically classified by type, e.g., satin weave, twill, burlap, etc., using the same nomenclature as other textiles. Composite fibers may also be gathered in bundles.

In a fiber composite material, the fiber properties drive the primary material properties. Fiber properties are extremely orthotropic, meaning they have dramatically different properties in the fiber and cross-fiber directions. These highly orthotropic properties are both the advantage and disadvantage of composite materials. Composite structures can be designed with structural material placed only in the areas required, and the properties of the material can be tailored to the specific area and type of stress they see in operation. A simple example is that of an "I" beam, where straight fibers are used along the caps and those fibers see primarily tension and compression loads, while biased fibers are placed on the beam web where primarily shear loads are present.

When this highly tailored, orthotropic design approach is used significant weight savings can be realized over traditional homogeneous material properties. However, the fiber laminate material properties are susceptible to slight changes in fiber orientation during manufacturing. For instance, a design may call for a 45-degree orientation for optimal performance, and shear stiffness performance will generally change with the sine of the angle, meaning a 5-degree misalignment will reduce axial properties by as much as 8.7% off the peak axial value. A variation of 5 degrees is not uncommon after manual handling of fabric and application using large manual tools.

The higher the degree of orthotropy in the fiber, the more susceptible that a lamination made from that fiber is to misalignment. For example, fiberglass unidirectional tape has extensional stiffness of approximately $5.6 \times 10^6$ lb/in$^2$ and lateral stiffness of $1.3 \times 10^6$ lb/in$^2$, a ratio of 4:1. In contrast, carbon fiber has an extensional stiffness of $16.7 \times 10^6$ lb/in$^2$ and lateral stiffness of $1.7 \times 10^6$ lb/in$^2$, a ratio of 10:1. Therefore the fall off of axial direction properties is much more sensitive with carbon unidirectional fibers than it is for glass unidirectional fibers.

In the creation of large composite structures, for example wind turbine blades, vehicle chassis, and structures for building construction, much of the fiber and/or fabric placement is conducted by hand, using manual tools. Fibers and/or fabrics are placed into an infusion tool dry, which allows for considerable slippage during the infusion phase. Dry fibers and/or fabrics must be used because of the limited handling time of mixed resins. Typically, resin is infused into the structure after dry fiber and/or fabric placement. Additionally, dry fibers and/or fabrics are traditionally handled and positioned together in an infusion tool at the final manufacturing site because of the difficulty in controlling their relative positioning. Pre-positioning of fabrics, followed by movement of the mold or transportation to an infusion site would cause significant misalignment and movement of dry fibers.

The majority of large composite structures are laminated at a location close to the place where the structures will be manufactured due to the limited handling time and reduced workability of a pre-infused or "prepreg" fibers and/or fabric. Although fiberglass infusion has been well-proven in large structures, as the need for even larger structures increases, the use of stiffer additive materials will be necessary. Unfortunately carbon fiber is not as absorptive as fiberglass, and attempts to infuse structures made of a combination of fiberglass and carbon often create voids and dry regions in the final structure. One method of increasing the wetting ability of carbon fiber in a laminate is to intersperse it within a fiberglass laminate. This allows resin to infiltrate thinner stacks of carbon layers and has the added benefit of dispersing the high tension loads of a carbon layer into the adjacent fiberglass structure through interlaminar shear.

Interleaving different materials introduces increased labor into the already time-consuming process of placing the composite materials into an infusion tool. For large structures the process of placing fibers and/or fabrics in the infusion tool is a major cycle time restriction. To alleviate this, large structures are often made of thicker fibers and/or fabrics to enable a rapid buildup of material thickness in the infusion tool. In addition, weaves of several fabric directions have been created to allow placement of several different plies at once, although these multi-axial fabrics are expensive. In some cases, mixes of carbon and glass fibers have been created. However all these methods are limited in total single ply laydown thickness to around 0.080 inches. This means that a large structural laminate with a thickness of 1-1.5 inches will require a minimum of 12-18 plies.

There is, therefore, an unmet need to have the ability to accurately control the positioning of dry laminate plies, particularly for relative fiber orientations, in an infusion tool.

SUMMARY

An object of the present invention is to enable the on-site infusion of a large composite structure with the application of a single part lamination. This part lamination would be an assemblage of all the optimized ply shapes and orientations held together by stitching. In this manner manual placement labor at the manufacturing site would be greatly reduced and transportation of the laminate without significant relative movement of the fibers within the laminate would be possible.

A further object of the invention is to improve upon the relative ply positioning accuracy within a multi-layer part lamination by controlling ply placement using an automated machine, and stitching plies together to ensure their stability during subsequent handling and transportation.

In one embodiment, plies of composite fibers and/or fabrics are cut into desired shapes according to a pattern for the particular part to be manufactured. The cut plies are then stitched together to form a dry stitched part lamination. Stitching advantageously enables tight control of the relative placement of multiple plies of composite material within the final structure. A variety of secure stitch types may be used, for example single- and/or double-needle chain stitches, serges, or lock stitches. The stitches may be single-sided stitches, double-side stitches, or a combination of both. The stitching in the dry stitched part lamination keeps all the plies in the correct position relative to one another, which reduces the manual handling needed to accurately place the dry lamination into an infusion tool.

Adjacent plies can be left with overlapping edges where the stitching is placed well back of the free edge. This allowance of free edge manipulation can be used to allow overlapping of plies in a subsequent laminate seam. In addition, these adjacent plies can be staggered to create a more pronounced overlap. Overlapped plies at a laminate joint will improve the structural robustness of a joint. In one embodiment, the side edges of a laminate sheet can be stitched to leave the edge plies free several inches back from the edge. The laminate sheet can then be placed in a tool that forms the laminate into a cylindrical tube shape. The free edges would then be interleaved together to create a completely enclosed laminate shape where the single seam of the laminate consists of an interleaved ply joint.

As plies of fibers and/or fabric are spooled out, cut and sewn, the resulting dry stitched part lamination may be spooled back into a single roll. The rolled dry stitched part lamination may then be packaged and transported to a manufacturing site which advantageously can be located close to the end-use location. This would allow the fiber-handling facility, with its higher non-reoccurring setup costs and facility costs, to be centrally located, ideally near a transportation hub to lower material transport costs. For very large structures where transportation of a fully cured laminated part becomes prohibitive, transportation of the rolled, dry fabric bundle and infusion at the end use location overcomes such transportation limits.

A single large roll consisting of a dry stitched part lamination for an entire part may be hoisted directly into an infusion tool and rolled out into place. Positioning marks on the topmost ply may be used to properly orient the dry stitched part lamination relative to the infusion tool using the assistance of laser placement systems or cameras. In one embodiment, the positioning marks are made automatically during laminate stitching by the automated stitching machine used to stitch the dry part lamination.

In one embodiment, material handling features are stitched into place on the edges of the dry stitched part lamination. The handling features, with or without a handling cord, may be used during handling and transportation of the dry stitched part lamination and for placing the dry stitched part lamination in an infusion tool. These handling features could lie outside the infusion area or be removed prior to infusion. In one embodiment, the handling features are sewn by the automated stitching machine used to stitch the dry part lamination.

BRIEF DESCRIPTION OF THE FIGURES

FIGS. 3A and 3B are diagrams of a ply stacking arrangement where pockets of specialized materials are held with stitching in a relative position on a ply of another material, according to one embodiment of the invention;

FIG. 4 is a diagram of staggered stitching of an overlapping edge of a dry stitched part lamination that will interface with the opposite edge when placed in an infusion tool, according to one embodiment of the invention;

DETAILED DESCRIPTION OF THE INVENTION

Figure 1:
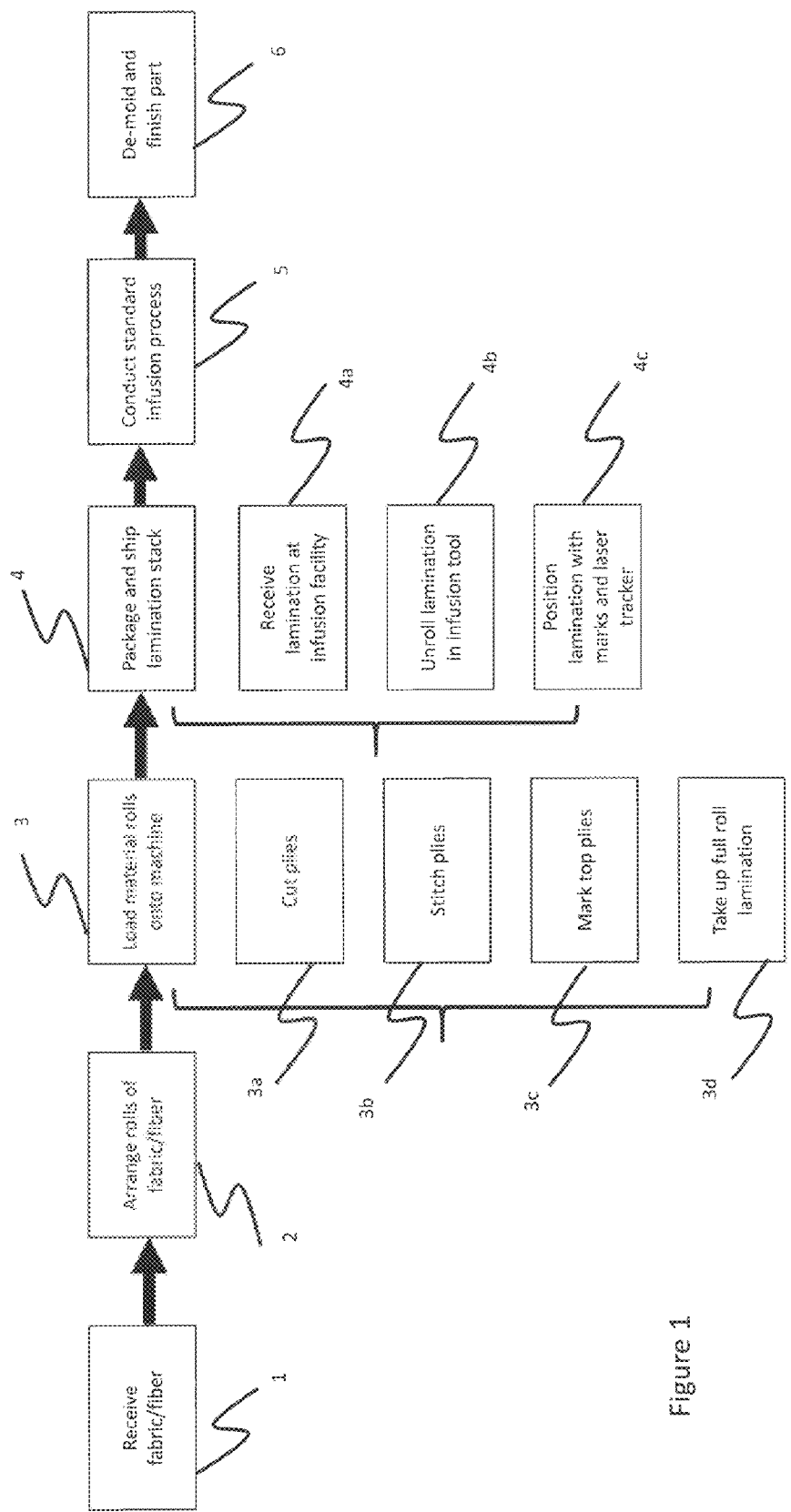
FIG. 1 is a flowchart of method steps for knitting, stitching, and packaging a dry stitched part lamination, according to one embodiment of the invention.

FIG. 1 is a flowchart of method steps for knitting, stitching, and packaging a dry stitched part lamination, according to one embodiment of the invention. In step 1, composite materials in the form of fibers and/or fabrics are received. In step 2, the received composite materials are arranged into a series of rolls to be spooled out. A single layer of composite material in the form of fibers or a woven fabric is referred to herein as a ply. The arrangement of the rolls of composite materials depends on the particular part to be manufactured. For example, different parts may require different fiber materials and different relative fiber orientations. In step 3, the plies of composite materials are loaded onto a machine for cutting and stitching.

In step 3a, the plies are cut into desired shapes according to a pattern for the particular part to be manufactured. In one embodiment, multiple plies of fibers and/or fabric are cut in parallel. Cutting of stock rolls of pre-determined laminate plies consisting of multiple material types allows the creation of complex, multi-layered dry part laminations with varied starts/stops and transitions of fiber types/orientations. The cutting may be accomplished using a reel-to-reel machine having multiple spools and cutting heads allowing for the processing of up to 50 plies simultaneously. Each spool of fiber or fabric would be individually tensioned and cut. Scrap material would be directed out of the machine in the material-spooling direction. Cutting could be accomplished using a variety of methods, from ultrasonic knives, to rolling and drag knives. Cutting heads are preferentially mounted on gantries and controlled by computer to allow complex shapes to be cut and rapid manipulation of the fibers.

In step 3b, the cut plies are then stitched together to form a dry stitched part lamination. In one embodiment, the thread used for stitching may be made of glass, Kevlar, or any other appropriate composite material. In other embodiments, the thread used for stitching may be made of cotton, polyester, nylon, plastic or a combination of traditional textile thread materials. The dry stitched part lamination includes all of the dry composite materials needed for the particular part to be manufactured. The stitching in the dry stitched part lamination keeps all the plies in the correct position relative to one another, which reduces the manual handling needed to accurately place the dry lamination into an infusion tool.

In one embodiment, a single machine both cuts and stitches the plies. In other embodiments, separate machines cut and then stitch the plies. In one embodiment, a single machine cuts and stitches the plies, and then spools the stitched lamination part into a roll. In one embodiment, the stitching is performed using robotic stitching heads. These heads may create single-sided stitches, or may be incorporated with heads beneath a layout table that work in complement with heads above the layout table to allow a double-sided stitch. For multiple parallel zones in a laminate, multiple heads stitch the plies at the same time as they are spooled together. Single-sided stitches may be single- and/or double-needle chain stitches, or a variety of other stitch styles. Stitching heads could sew multiple plies at a time or just two plies together. By using a gantry system across a spooling laminate, stitches may be made in both X (along the spool) and Y (across the spool) directions In step 3c, the plies on the top of the dry stitched part lamination are marked with alignment or positioning marks that assist in correct positioning of the dry stitched part lamination into an infusion tool. In step 3d, the dry stitched part lamination is rolled for transportation. In another embodiment, the cutting and stitching machine or machines are located at the same site as the infusion tool, such that the dry stitched part lamination may be fed directly into an infusion tool.

In step 4, the rolled dry stitched part lamination is packaged and shipped to the manufacturing site where the dry stitched part lamination will be infused with resin. In step 4a, the dry stitched part lamination is received at the manufacturing site and the packaging is removed. In step 4b, the dry stitched part lamination is unrolled directly into the infusion tool. In step 4c, the dry stitched part lamination is accurately positioned in the infusion tool by adjusting the position of the dry stitched part lamination so that the positioning marks on the top plies are aligned with laser indicators projected from a positioning guide. In step 5, the dry stitched part lamination is infused with resin using a standard vacuum infusion process. In step 6, the infused part lamination is removed from the infusion tool and the surface of the part is finished.

Figure 2:
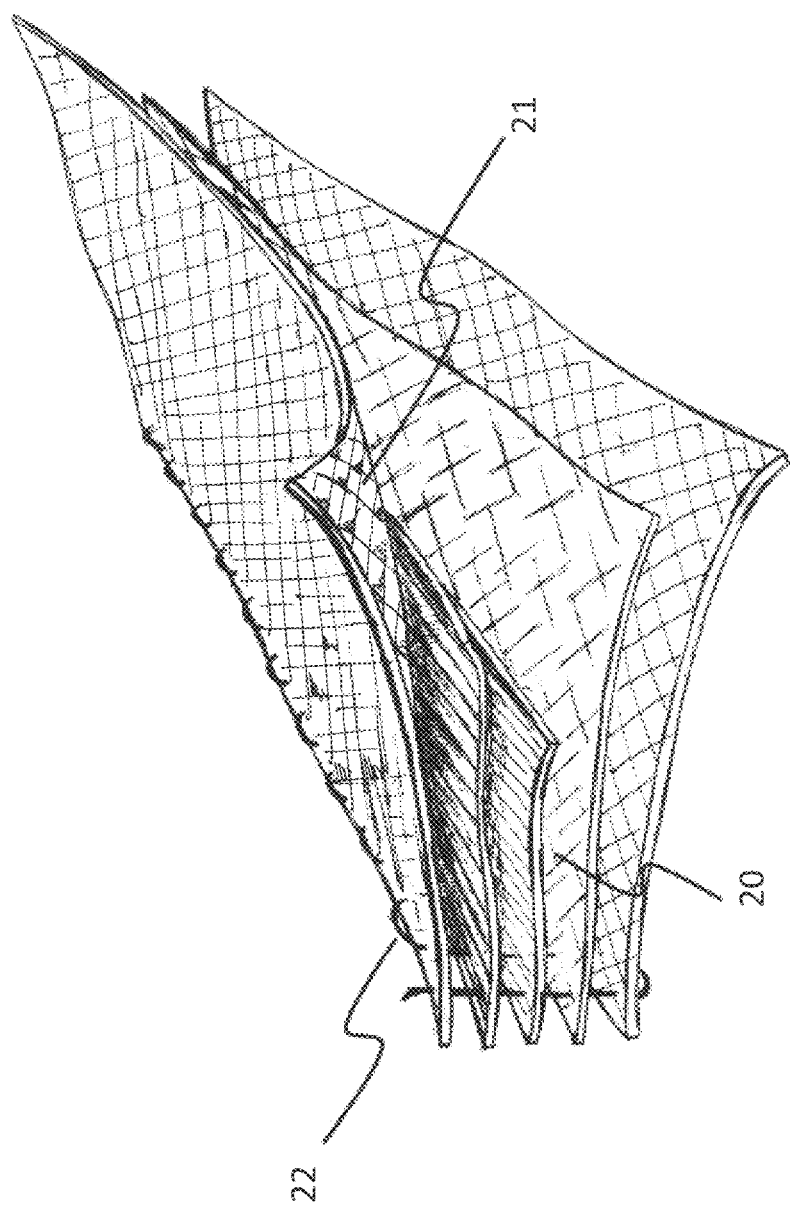
FIG. 2 is a diagram of a relative ply stacking arrangement where multiple varied composite materials are held together with stitching, according to one embodiment of the invention.

FIG. 2 is a diagram of a ply stacking arrangement where multiple plies of varied composite materials are held together with stitching, according to one embodiment of the invention. In the FIG. 2 embodiment, all plies that will form the final part lamination are held together with a single row of stitches 22 through all of the plies. In other embodiments, discrete groupings of plies can be stitched together and the stitching can be staggered to create a single combined attachment of all plies. Stitches 22 may be a variety of stitch styles, for example single- and/or double-needle chain stitches. Stitches 22 may be single-sided stitches, double-side stitches, or a combination of both.

A variety of stitch types may be used depending on the types of composite materials and fiber orientations in adjacent plies within the lamination, however the stitch type used must be a secure stitch that will not unravel during handling. For instance, a ply of multi-directional-fiber fabric may be stitched together with a ply of unidirectional-fiber fabric using a chain stitch along the selvage edge of the unidirectional-fiber fabric. This would reduce the induced waviness of the stitch on the unidirectional fibers, maintaining their axial strength. In addition to a chain stitch, other types of secure stitches such as locked stitches may be used. Additionally, stitching could be done in a staggered fashion to reduce overall stitching time or stitch weight. For example, in laminates where the entire stack thickness exceeds the stitching thickness capability, stitches can be staggered across several plies to create a continuous Z-direction securement of plies in a stepwise fashion.

Multiple material types and fibers or fabrics with varying orientations of fibers may be placed adjacent to one another. As shown in FIG. 2, two plies of unidirectional carbon fibers 20 are placed between plies of fiberglass fabrics 21 that have fibers running in multiple directions.

Terminations of individual plies can be stitched along the free edges to maintain the fiber positioning, and to reduce inter-laminar peel stresses in some laminates. Free edges along the fiber direction can also be stitched. In unidirectional fabrics, the selvage edge can be used to secure stitching along the fiber direction. In addition, individual plies can be cut and terminated within the laminate by cutting and placing them before the complete lamination is combined. Stitching can be used to secure these individually terminated plies within the dry stitched part lamination.

FIGS. 3A and 3B are diagrams of a ply stacking arrangement where pockets of specialized materials are held with stitching in a relative position on a ply of another material, according to one embodiment of the invention. In the FIG. 3 embodiment, pockets of specialized materials 30 are held with stitching in a relative position on another material layer 33. A fiber stack 30 is stitched separately to group discrete plies and control their position. The position of fiber stack 30 is controlled by creating a pocket between a top ply 32 and a bottom ply 33. Stitching through top ply 32 and bottom ply 33 on a first side 34 and a second side 35 of fiber stack 30 creates a pocket within which the fiber stack 30 is held.

FIG. 4 is a diagram of staggered stitching of an overlapping edge of a dry stitched part lamination that will interface with the opposite edge when placed in an infusion tool, according to one embodiment of the invention. Stitching 40 for staggered laminate layers is placed away from the edges of the dry stitched part lamination to allow interweaving of the loose edges during lamination placement in the infusion tool 43. Adjacent top 40 and bottom 41 plies can be separated to interweave with mating plies from the other edge of the dry stitched part lamination. This interweaving of adjacent ply transitions or joints increases the peel strength of the joint and reduces the possibility of catastrophic failure in the joint.

Figure 5:
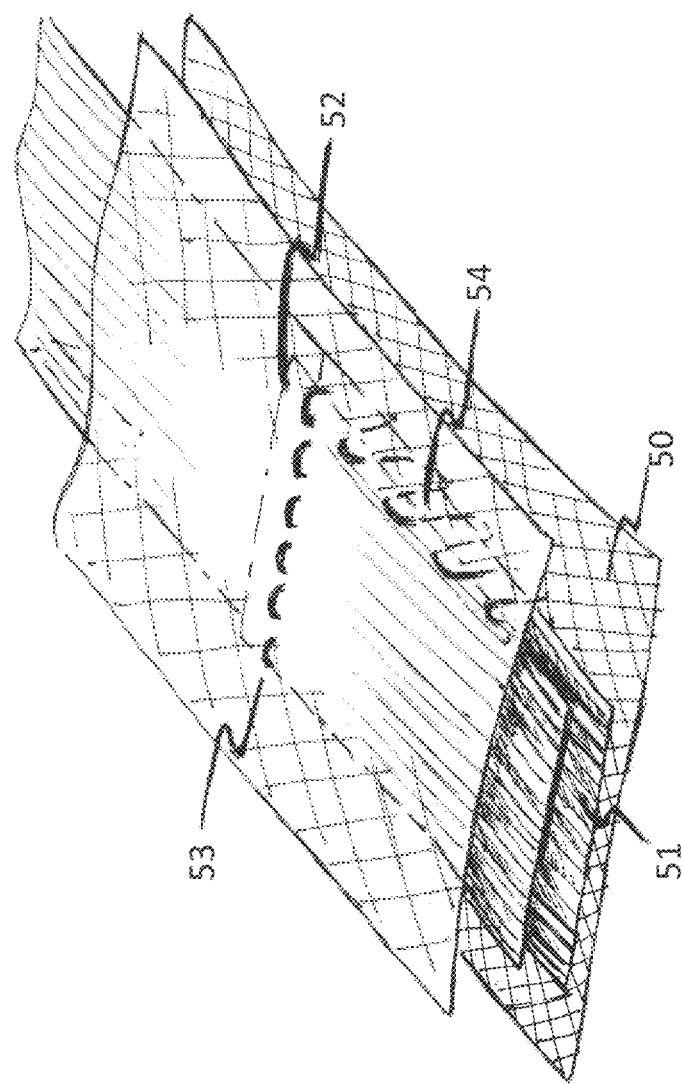
FIG. 5 is a diagram of a termination of a ply within a dry stitched part lamination and the use of stitching to secure the terminated end, according to one embodiment of the invention.

FIG. 5 is a diagram of a termination of a ply within a dry stitched part lamination and the use of stitching to secure the terminated end, according to one embodiment of the invention. Discrete fiber plies 51 run continuously through the dry stitched part lamination. Where less material is required, a discrete fiber ply can be terminated at an edge 52 that lies inside the outer edges of the dry stitched part lamination. This terminated edge 52 can be secured with a row of stitches 53 that controls the relative position of this inside ply. Stitching 54 along the edge of the inside ply in the fiber direction can also be used to secure that ply within the dry stitched part lamination.

Figure 6:
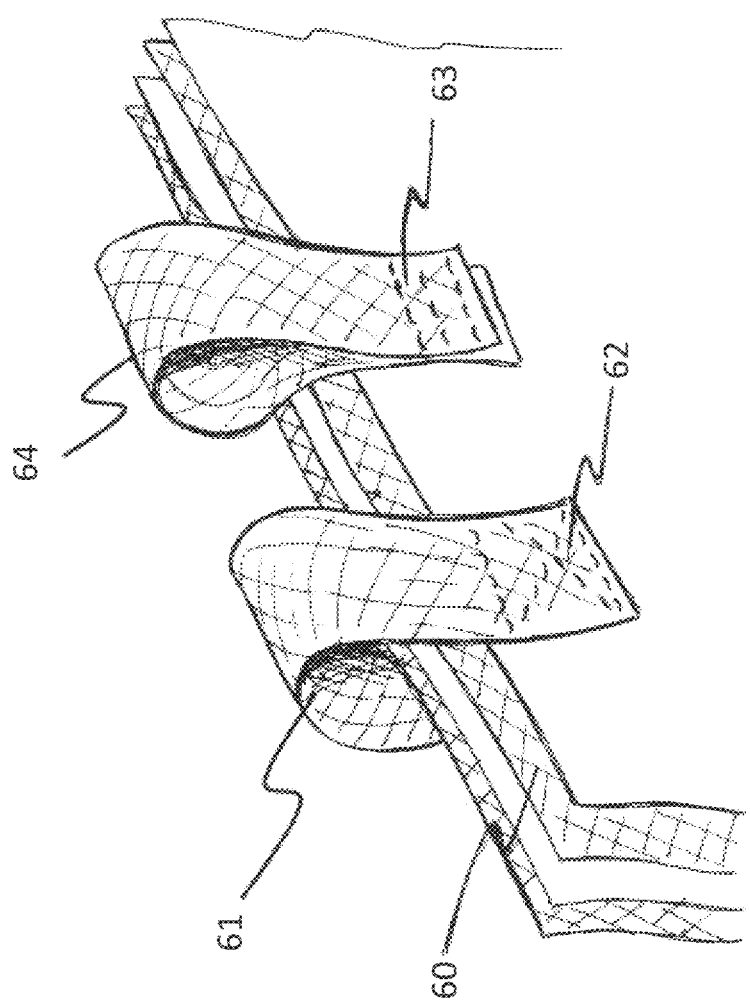
FIG. 6 is a diagram of dry stitched part lamination with handling loop features attached, according to one embodiment of the invention.

FIG. 6 is a diagram of a dry stitched part lamination with handling loop features attached. The free edge 60 of the dry stitched part lamination has a handling loop feature 61 stitched one each side 62 of the dry stitched part lamination to bridge the entire lamination. Another handling loop feature 64 does not bridge the edge of the dry stitched part lamination but rather both ends of handling loop feature 64 are stitched onto the same side 63 of the dry stitched part lamination. These features 63, 64 can remain attached to the dry stitched part lamination after infusion, or can be removed prior to infusion. In one embodiment, handling loop feature 61 is attached to the dry stitched part lamination by the same machine that stitched the dry stitched part lamination.

Figure 7:
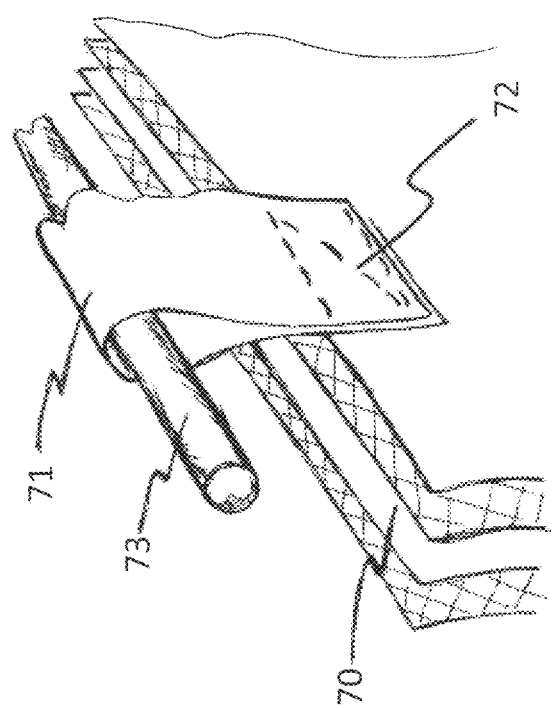
FIG. 7 is another diagram of a dry stitched part lamination with a handling loop feature attached, according to one embodiment of the invention.

FIG. 7 is another diagram of a dry stitched part lamination with a handling loop feature attached, according to one embodiment of the invention. The free edge 70 of the dry stitched part lamination can have one or more loop features 71 secured on one side 72 of the dry stitched part lamination. The loop features 71 can have a nylon or other cord 73 threaded through them for the entire length of the dry stitched part lamination. In another embodiment, a single continuous loop feature (not shown) can be attached along the entire length of the edge of the dry stitched part lamination and have a cord threaded through it. The dry stitched part lamination can be handled using the cord 73. In one embodiment, handling loop feature 71 is attached to the dry stitched part lamination by the same machine that stitched the dry stitched part lamination.

Figure 8:
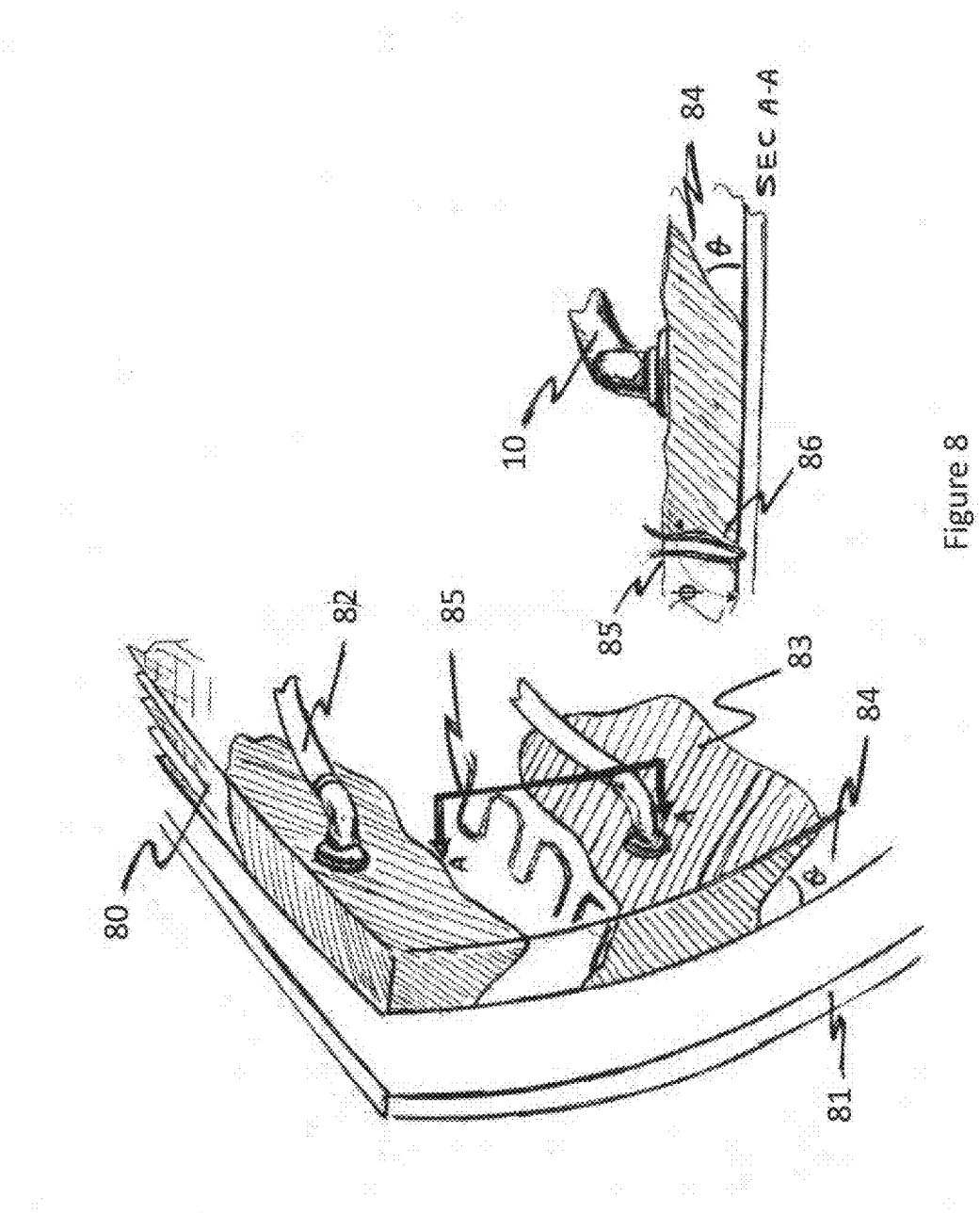
FIG. 8 is a diagram of a dry stitched part lamination in which the stitching is used to control the resin flow front during infusion; according to one embodiment of the invention.

FIG. 8 is a diagram of a dry stitched part lamination in which the stitching is used to control the resin flow front during infusion; according to one embodiment of the invention. The dry stitched part lamination 80 is positioned in an infusion tool 81, ready for infusion. Infusion proceeds from infusion points 80 and the resin propagates through the thickness of the dry stitched part lamination along a resin flow front 83. This flow front 83 has an inclusion angle 84 measured from the edge of the dry stitched part lamination that is a function of the resin and fiber infusion parameters. It is desired to create a large resin inclusion angle 84 so that infusion proceeds evenly through the dry stitched part lamination 80. Stitching 85 has been advantageously placed in the dry stitched part lamination to encourage resin infusion along a row of stitches in the stitch direction, thus improving the inclusion angle 86 (denoted by $\phi$) near the stitching.

Figure 9:
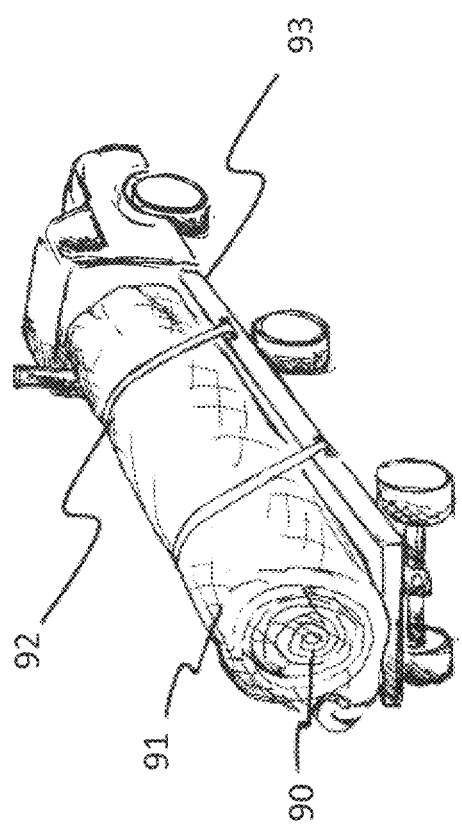
FIG. 9 is a diagram of a dry stitched part lamination formed into a roll for transportation, according to one embodiment of the invention.

FIG. 9 is a diagram of a dry stitched part lamination formed into a roll for transportation, according to one embodiment of the invention. The entire dry stitched part lamination is spooled onto a single roll 90. The rolled dry stitched part lamination is then packaged 91 and secured using straps 92 onto a flatbed truck 93. The packaging may be a heat-sealed plastic roll with desiccant or a cardboard tube.

Figure 10:
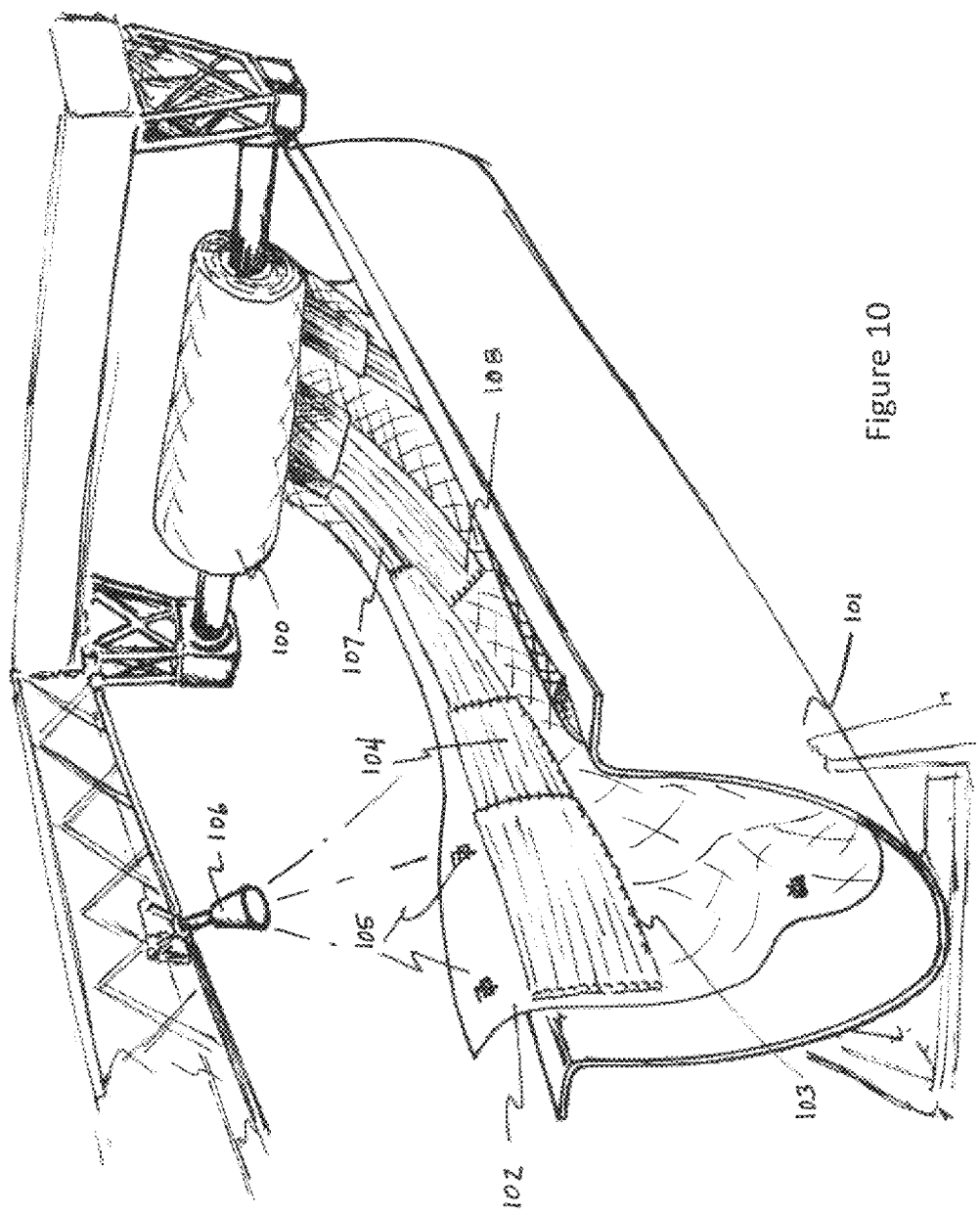
FIG. 10 is a diagram of a dry stitched part lamination installed into an infusion tool, according to one embodiment of the invention.

FIG. 10 is a diagram of a dry stitched part lamination installed into an infusion tool, according to one embodiment of the invention. The edge of the dry stitched part lamination 100 is placed at the edge of the infusion tool 101 and the remainder of the dry stitched part lamination 100 is gradually placed into the infusion tool 101 as the dry stitched part lamination is unrolled. The dry stitched part lamination 100 has stitches 103 running along the roll direction to secure plies together, and other stitches staggered through fewer plies than the total thickness of the dry stitched part lamination. The topmost visible plies have been marked with positioning marks 105 so that the orientation of the entire dry stitched part lamination 100 within the infusion tool 101 can be determined by overhead cameras 106 or laser pointers (not shown). In one embodiment, overhead camera 106 is a visible or infrared spectrum camera. Additionally, some internal plies 107 terminate before the edge of the dry stitched part lamination and have been stitched along their termination edge 108 to secure them within the dry stitched part lamination.

Figure 11:
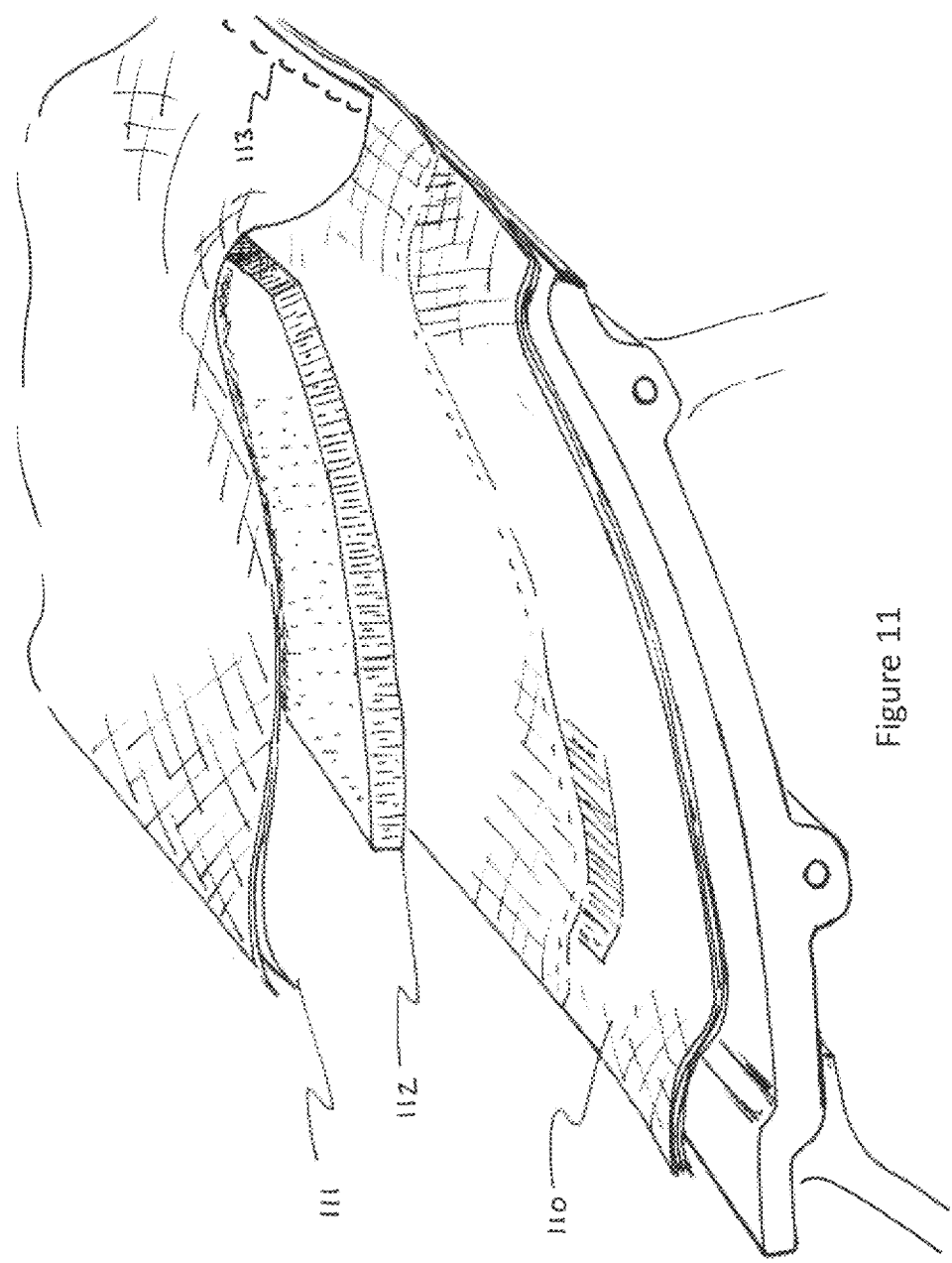
FIG. 11 is a diagram of two dry stitched part laminations with a core material placed between them, according to one embodiment of the invention.

FIG. 11 is a diagram of two dry stitched part laminations with a core material placed between them, according to one embodiment of the invention. Two dry stitched part laminations 110 and 11 have a core material 112 placed between them. The core material 112 may be made of balsa wood, felt foam, or any other appropriate material. The bottom dry stitched part lamination 110 will become the outermost plies of the final part. It is most advantageous for the outermost dry stitched part lamination 110 to be thicker, with more load carrying capability, than the inner dry stitched part lamination 111. A single edge of the outer and inner dry stitched part laminations can be stitched together with stitches 113 to partially secure the core material 112 and to dictate its position in the final part.

The cutting and stitching of structural laminates as disclosed herein provides distinct advantages over manual fiber and/or fabric placement and application of multiple individual fiber layers in an infusion tool. The dry stitched part lamination for the entire part is able to be transported and placed into an infusion tool while maintaining the relative placement of the fibers within the dry stitched part lamination. Manual labor is not required to cut out pattern pieces or to move fabric plies into position in an infusion tool. Additionally, the optional handling features assist in the installation of the dry stitched part lamination into an infusion tool.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for forming a dry lamination for a composite fiber material structure, the method comprising:
    cutting at least two plies of composite fiber material according to a predetermined pattern;
    arranging the at least two cut plies of composite fiber material in a predetermined arrangement relative to each other;
    stitching the at least two cut plies together using a thread to secure the at least two cut plies in the predetermined arrangement to form the dry lamination; and
    spooling the dry lamination into a single roll.

2. The method of claim 1, further comprising:
    arranging a third cut ply of composite fiber material in between the at least two cut plies such that an edge of the third cut ply is positioned a distance from an edge of the dry lamination; and
    stitching the at least two cut plies and the third cut ply using a thread such that the edge of the third cut ply is secured at the distance from the edge of the dry lamination.

3. The method of claim 1, further comprising:
    arranging a plurality of cut plies into a fiber stack;
    stitching the fiber stack using a thread to secure the positions of the plurality of cut plies within the fiber stack;
    arranging the fiber stack between the at least two cut plies in a predetermined position; and
    stitching the at least two cut plies using a thread to form a pocket that holds the fiber stack in the predetermined position.

4. The method of claim 1, further comprising marking a surface of the dry lamination with at least one alignment mark that assists in positioning the dry lamination in a resin infusion tool.

5. The method of claim 1, further comprising attaching handling features to the dry lamination.

6. The method of claim 1, wherein stitching the at least two plies includes stitching from a single side of the dry lamination.

7. The method of claim 1, wherein stitching the at least two plies includes stitching from two sides of the dry lamination.

8. The method of claim 1, wherein stitching the at least two plies includes stitching a row of stitches in a position such that the row of stitches assists resin infusion along the row of stitches in the stitch direction.

9. A dry lamination for a composite fiber material resin-infused structure comprising:
   at least two plies of composite fiber material, each of the at least two plies cut into the shape of one of a plurality of pattern pieces, the at least two plies in a predetermined arrangement relative to each other; and
   stitches made of a thread that secure the at least two plies of composite fiber material in the predetermined arrangement,
   wherein the at least two plies are the entirety of plies required for formation of the composite fiber material resin-infused structure.

10. The dry lamination of claim 9, further comprising:
    a third ply of composite fiber material in between the at least two plies such that an edge of the third ply is positioned a distance from an edge of the dry lamination, and
    stitches made of a thread that secure the edge of the third ply in its position.

11. The dry lamination of claim 9, further comprising:
    a fiber stack including a plurality of plies of composite fiber material secured in a predetermined arrangement relative to each other; and
    stitches made of a thread in the at least two plies that form a pocket containing the fiber stack.

12. The dry lamination of claim 9, further comprising at least one alignment mark that assists in positioning the dry lamination in a resin infusion tool.

13. The dry lamination of claim 9, further comprising at least one handling feature attached to a surface of one of the at least two plies of composite fiber material.

14. The dry lamination of claim 9, wherein the stitches include a row of stitches in a position such that the row of stitches assists resin infusion along the row of stitches in the stitch direction.

15. The dry lamination of claim 9, further comprising a third ply of composite fiber material in between the at least two plies and wherein the stitches secure a lengthwise termination of the third ply within the adjacent at least two plies.

16. A method of forming a dry lamination for a composite fiber material structure, the method comprising:
    cutting a plurality of plies of composite fiber material into predetermined shapes according to a pattern, wherein the plurality of plies are the entirety of plies required for formation of the composite fiber material structure;
    arranging the plurality of cut plies of composite fiber material into a predetermined arrangement relative to each other;
    stitching together a first portion of the plurality of cut plies, the first portion including fewer than all of the plurality of cut plies, using a thread to secure the first position of the plurality of cut plies in the predetermined arrangement; and
    stitching together a second portion of the plurality of cut plies, the second portion including fewer than all of the plurality of cut plies and including at least one of the cut plies in the first portion, using a thread to secure the second portion of the plurality of cut plies in the predetermined arrangement.

17. The method of claim 16, further comprising:
    arranging a fiber stack between at least two of the plurality of plies in a predetermined position; and
    stitching the at least two of the plurality of plies using a thread to form a pocket that holds the fiber stack in the predetermined position.

18. The method of claim 16, further comprising marking a surface of the dry lamination with a t least one alignment mark that assists in positioning the dry lamination in a resin infusion tool.

19. The method of claim 16, further comprising attaching handling features to the dry lamination.

* * * * *